Dec. 6, 1949   P. M. HENKES ET AL   2,490,128
MOUNTING FOR TRACERS
Filed Feb. 8, 1945   4 Sheets-Sheet 2
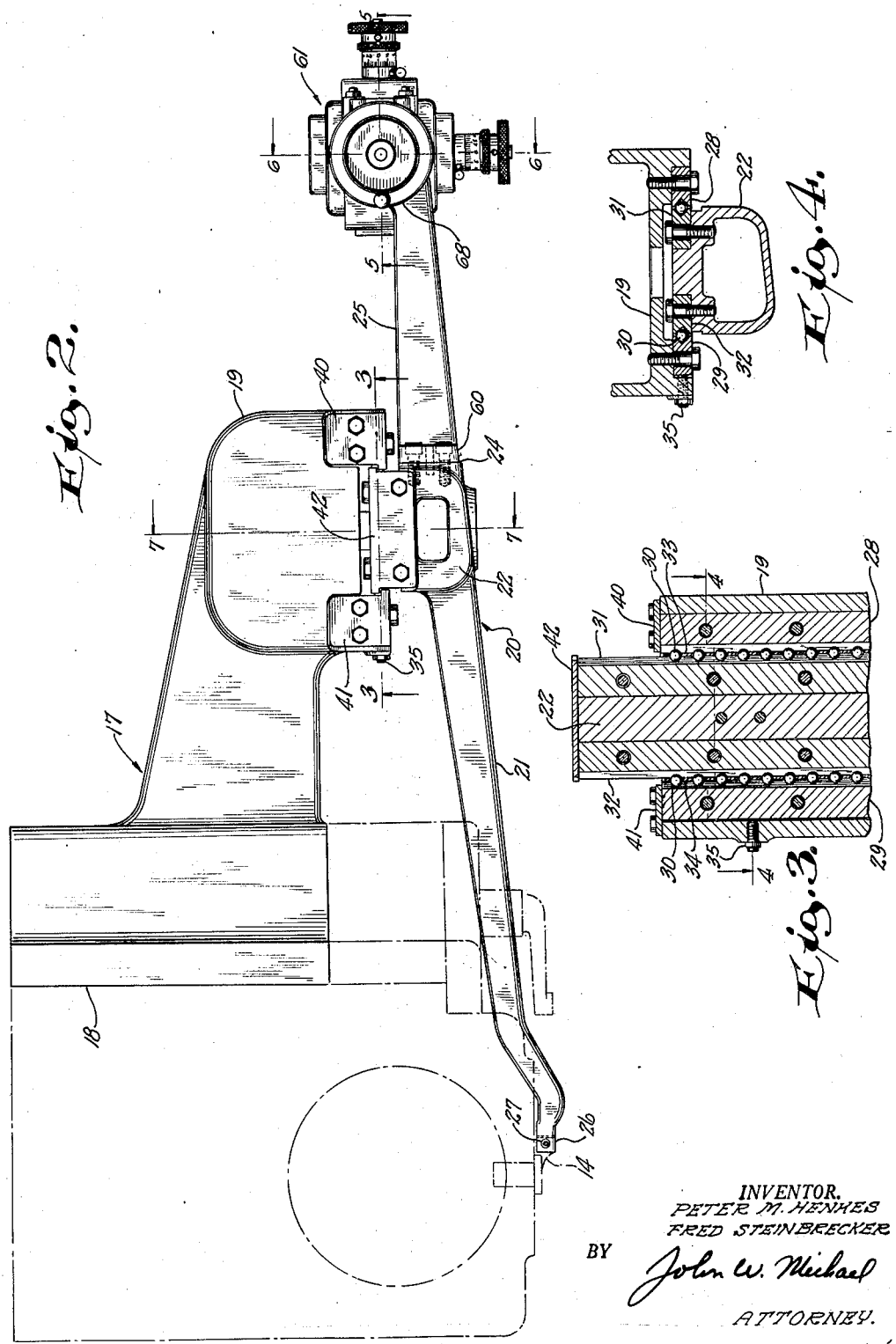
INVENTOR.
PETER M. HENKES
FRED STEINBRECKER
BY John W. Michael
ATTORNEY.

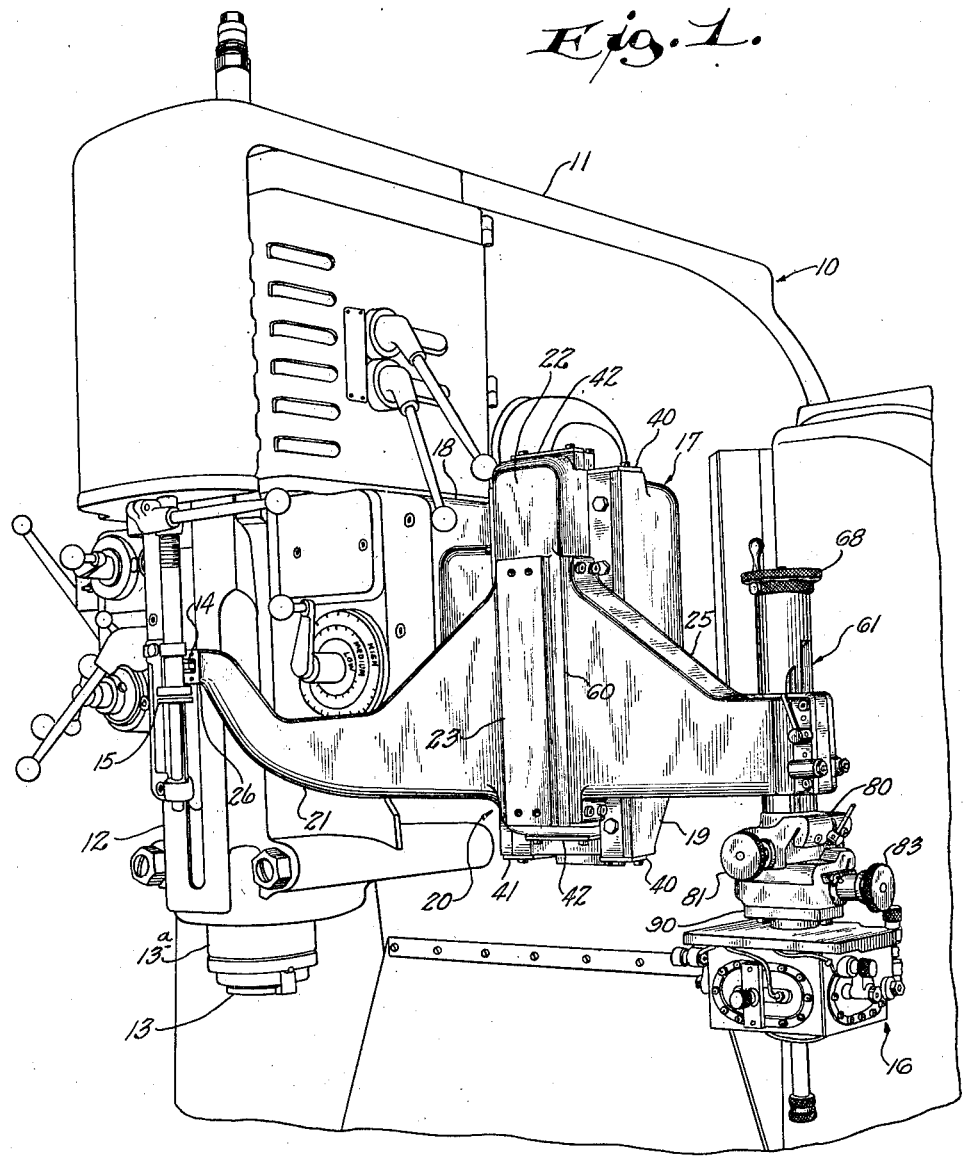

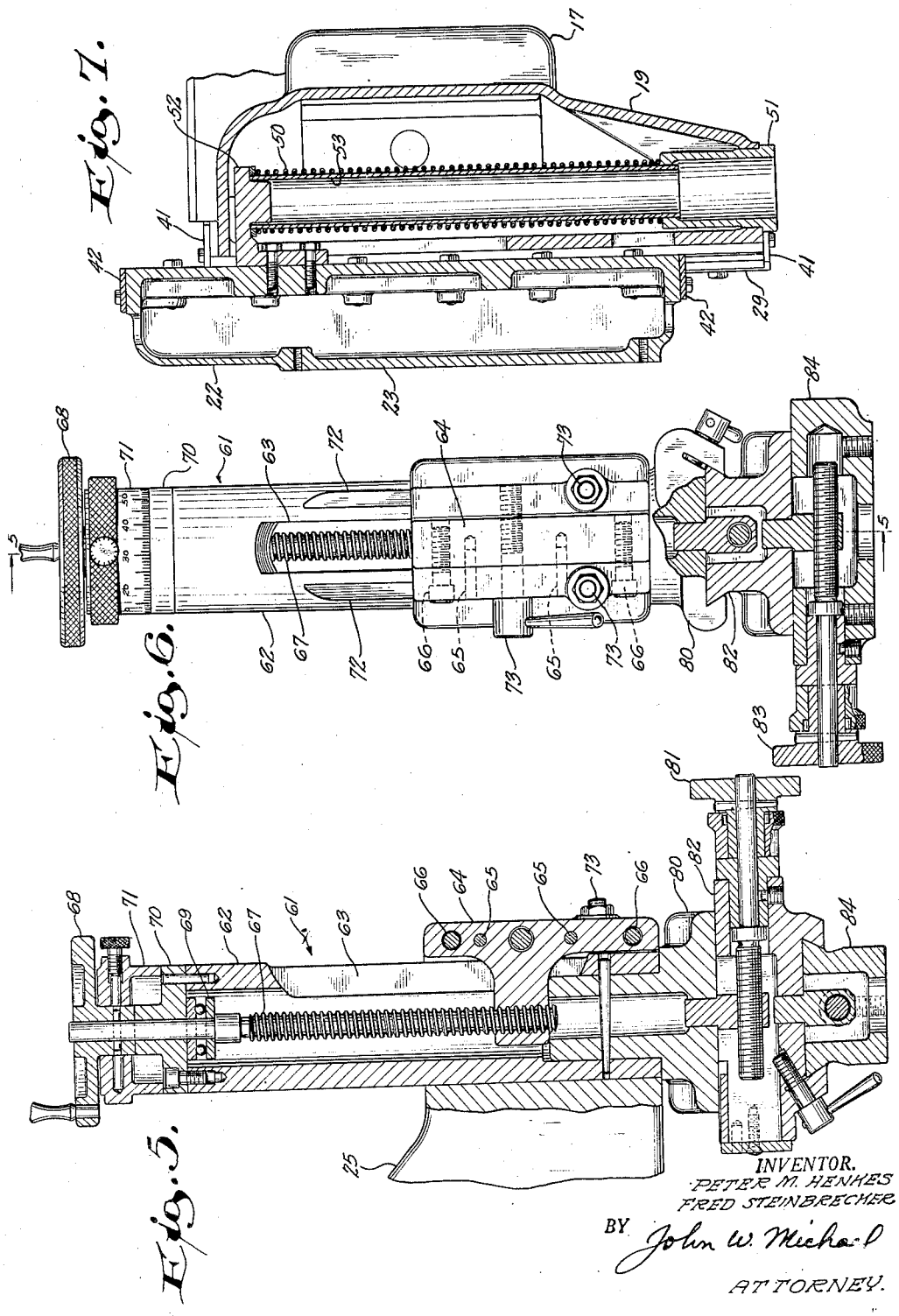

Dec. 6, 1949   P. M. HENKES ET AL   2,490,128
MOUNTING FOR TRACERS

Filed Feb. 8, 1945   4 Sheets-Sheet 4

INVENTOR.
PETER M. HENKES
FRED STEINBRECKER
BY John W. Michael
ATTORNEY.

Patented Dec. 6, 1949

2,490,128

UNITED STATES PATENT OFFICE 2,490,128

MOUNTING FOR TRACERS

Peter M. Henkes and Fred Steinbrecker, Racine, Wis., assignors to George Gorton Machine Company, Racine, Wis., a corporation of Wisconsin Application February 8, 1945, Serial No. 576,796

8 Claims. (Cl. 90—13)

This invention relates to improvements in mountings for tracers forming a part of control systems for machine tools.

Three-dimensional control tracers, which are used with machine tools of the so-called duplicator type, must be movable longitudinally with the cutter spindles. It has been the practice to mount the tracers on spindles slidably carried at the ends of rigid arms projecting laterally from the cutter heads of the machines. Such spindles are moved simultaneously with the cutter spindle by means of gear teeth in the quills or cutter spindle sleeve meshed with pinions on a cross shaft carried in such rigid arms. One of the defects of this construction is the transmission of detrimental vibrations to the tracer by such arms. Another objection is the loss of accuracy and the undesirable lag between tracer spindle and cutter spindle resulting from the use of shafting and gears to effect simultaneous movement.

One of the objects of the present invention therefore is to provide a mounting for tracers which will not transmit harmful vibrations to the tracer.

Another object of the invention is to provide a mounting for the tracer which will cause the tracer to move simultaneously with the cutter spindle without any measurable lag therebetween.

The foregoing objects are obtained by providing a main supporting arm and fixed guiding member rigidly secured to the cutter head; by providing a relatively movable member which is guided by the fixed guiding member to reciprocal movement parallel to the longitudinal movement of the cutter spindle; by balancing the control arm and tracer-carrying arm with the tracer about the relatively movable member; by providing a frictionless sliding bearing between the fixed guiding member and the relatively movable member; by utilizing a balancing spring to counter-balance the over-all weight of the control arm, tracer-carrying arm, relatively movable member, and tracer; and by connecting the relatively movable member directly to the quill of the cutter spindle. The sliding bearing formed between the fixed guide and the relatively movable member preferably has considerable length to prevent any movement therebetween other than in a fixed axis parallel to the axis of the cutter spindle. By balancing the control arm and tracer-carrying arm about the relatively movable member, unnecessary vibrations are eliminated, and still the tracer may be carried at a sufficient distance from the cutter spindle to accommodate both the work and the pattern on the table in end-to-end relationship. The direct connection between the relatively movable member and the quill of the cutter spindle eliminates lag and relative movement therebetween, and thus accurately moves the stylus carried by the tracer simultaneously with the axial movement of the cutter.

Referring to the accompanying drawings forming a part hereof, Figure 1 is a view in perspective of a three-dimensional tracer mounting embodying the invention, such mounting being attached to the cutter head of a vertical milling machine shown only in fragmentary view;

Figure 2 is a top plan view of the tracer mounting of Figure 1 with adjacent portions of the milling machine shown diagrammatically;

Figure 3 is a fragmentary sectional view taken on the line 3—3 of Figure 2 to illustrate the sliding bearing between the fixed guide and the relatively movable member;

Figure 4 is a fragmentary sectional view taken on the line 4—4 of Figure 3;

Figure 5 is an enlarged sectional view taken on the line 5—5 of Figure 2;

Figure 6 is an enlarged sectional view taken on the line 6—6 of Figure 2;

Figure 7 is a fragmentary enlarged sectional view taken on the line 7—7 of Figure 2;

Figure 8:
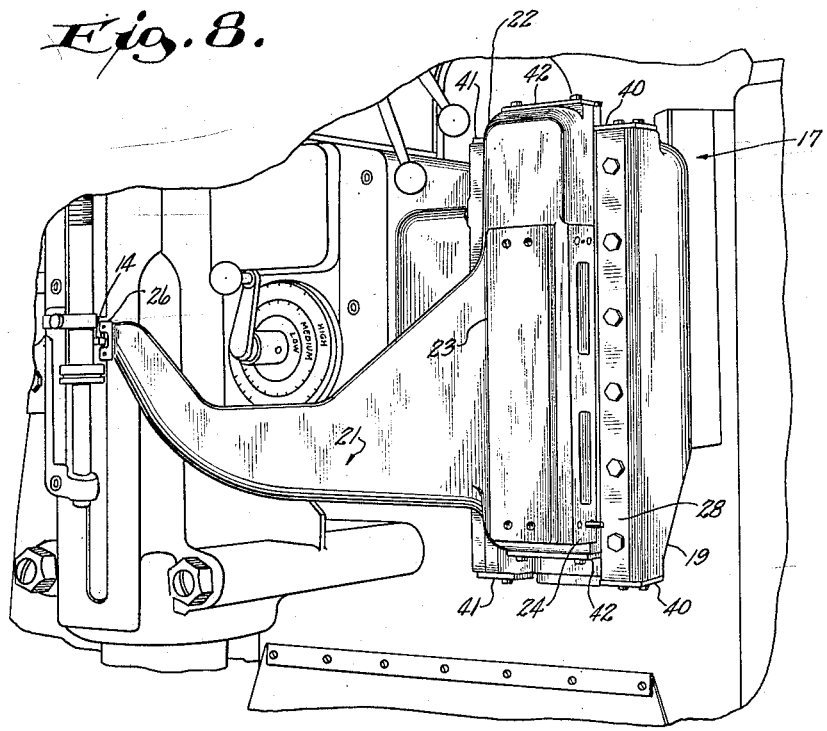
Figure 8 is a perspective view of the main supporting arm or fixed guiding member and the control arm which connects the relatively movable member to the lug on the quill of the cutter spindle.

Referring in greater detail to the drawings, the mounting for the tracer is shown on a vertical milling machine designated generally at 10. The machine 10 is shown only in part, as it is of a design known to those skilled in the art. It has a ram 11 which carries a cutter head 12 in which is mounted the cutter spindle 13 carried in a quill or sleeve 13a which provides for its reciprocal longitudinal movement. A lug 14 carried by the quill projects outwardly from the cutter head through a slot. This lug customarily forms one of the elements of the adjustable spindle depth stop mechanism, illustrated generally at 15. In this instance it is also used with the tracer mounting as hereinafter described.

The tracer 16, shown in Figure 1, is of the three-dimensional type, and is fully described and claimed in an application Serial No. 547,081, of Theodore Miller filed July 28, 1944, and now pending in the United States Patent Office, and assigned to the same assignee as this application, which application is entitled "Tracers." The tracer 16 is mounted by a coupling flange 90 to the micrometer universal adjustable tracer-holding mechanism 61 hereinafter more particularly described. The operation of the tracer 16 in the control of the movements of the table and in the vertical feed of the cutting spindle are fully described in the foregoing application and in another application, Serial No. 514,125, of Theodore Miller filed December 13, 1943, and now Patent No. 2,247,201, granted August 17, 1948, assigned to the assignee of this application and entitled "Tracers and tracer controlled operation of machine tools and other cutting machines." For the purposes of this invention, it is pointed out that the tracer in order to operate accurately and to be sensitive must remain in a fixed position relative to the cutter spindle in all positions of the latter. It must move along a fixed axis parallel to the axis of rotation of the cutter spindle in the same direction and in the same amounts and at the same time as the movement of the cutter spindle along such axis of rotation. To accomplish this, there is provided a main support or arm 17 which is rigidly secured to the cutter head 12 by having its base portion 18 bolted or otherwise fastened to the side of the ram. The arm 17 projects laterally from the ram, and its outer end is provided with an elongated casing 19, which provides a housing for the balancing spring 50 and a support for the fixed guiding member of the ball bearing slide hereinafter described.

The tracer support designated generally at 20 may be constructed of two parts. One part may be designated the control arm 21. It has at one end an elongated casing 22 which is positioned opposite the casing 19 and forms the support for the relatively movable member of the ball bearing slide. The casing 22 is provided on its outer ends with two mounting pads 23 and 24 (see Figure 8) on which the detachable tracer-holding arm 25 may be alternately mounted. The other end of the control arm 21 has a jaw-like portion 26 which straddles the lug 14. Each of the jaw members has an adjusting screw 27 which engage the lug 14 from opposite sides, and by means thereof motion imparted to the lug 14 by the movement of the quill will be simultaneously imparted to the tracer control arm 21 without any lag or relative motion therebetween.

The ball bearing slide or guide between the main support 17 and the tracer support 20 comprises a pair of opposed outer ways 28 and 29 (see Figures 3 and 4) which are bolted to the face of the casing 19 and form a fixed member. The opposed faces of these ways are grooved to receive a plurality of spaced balls 30. A pair of inner ways 31 and 32 are bolted to the inner face of casing 22 to form a relatively movable member. These ways also have ball bearing-receiving grooves oppositely related to the grooves in the ways 28 and 29. In order to obtain a proper rolling action, the balls 30 are kept in proper spaced relationship during the relative movement of the members of the guide, by retainers 33 and 34 which have holes for each ball. These retainers are positioned, and are freely slidable, between the opposed faces of the ways and move to permit the rolling of the balls. In order to permit adjustment of the ball bearing slide, a pair of adjusting screws 35 (only the upper one of which is shown in the drawing) are threaded into one side of the casing 19. The adjusting of these screws moves the way 29 inwardly toward the way 28, thereby placing the balls and ways under desired compression. End plates 40 and 41 are provided on the top and bottom ends of the ways 28 and 29, and end plates 42 are provided on the tops and bottoms of ways 31 and 32 to prevent the balls and their respective retainers from leaving the ways as such ways are moved relative to each other. These plates have overlapping projections which cooperate to cover the end of the grooves in the ways and still permit relative movement between these plates. It is desirable to proportion the length of the retainers that when the inner ways move from one extreme to the other extreme of their travel relative to the outer ways, the rolling action of the balls will not be hindered by the retainers striking at either end of their travel. The ball bearing slide is relatively long and thus prevents canting and resultant binding between the movable member and the fixed member as they move from their extremes of travel.

In order to lessen the strain on the lug 14 and to increase the sensitiveness of the entire device, the total weight of the movable member, the control arm, the tracer-carrying arm, and the tracer is substantially completely carried by a coiled compression spring 50 shown in detail in Figure 7. The lower end of spring 50 abuts on a bearing 51 carried on the bottom of the casing 19. The other end of spring 50 abuts against an arm 52 secured to the inner face of casing 22 and projecting within the casing 19. To prevent the spring from buckling as it is compressed, a tube 53 is inserted within the spring and is mounted on a pad carried by the arm 52. The tube 53 is slidably guided in an opening in the bearing 51. Thusly balanced, it requires only a nominal force transmitted from the lug 14 to the control arm 21 to cause the tracer to move simultaneously with the cutter spindle.

The tracer-carrying arm 25 has an enlarged end 60 provided with a flat surface engageable with either of the mounting pads 23 or 24. This end is flatly positioned on the desired mounting pad, and thereafter bolted or otherwise rigidly but detachably secured. The outer end of the arm 25 carries a micrometer adjustment mechanism shown in Figures 5 and 6 by means of which the tracer may be adjusted universally to a desired position relative to the cutter spindle. This adjusting mechanism will be hereinafter described in more detail. It is a feature of this invention that the control arm 21 and holding arm 25 are proportioned so that the center of gravity of the entire movable part, including the tracer, is substantially centered about the sliding bearing. This permits the tracer to be spaced a greater distance from the cutter spindle than if the weight of the tracer were supported by an arm extending from the main frame or cutter head of the milling machine to the tracer. Detrimental vibrations are prevented by thus supporting the tracer. With the carrying arm 25 positioned as illustrated in Figure 1, the pattern is placed in substantially end-to-end relation with the work. If it is desirable because of the unusual length of the work to place the pattern and the work in side-by-side position on the table, the carrying arm 25 is positioned on the pad 23 and extends at 90° to the control arm 21, thus placing the tracer 16 outwardly of the cutter spindle. However, the pads 23 and 24 may be placed at other relative angles than 90° to accomplish a desired off-setting of the tracer 16.

The universal micro-adjustment holding mechanism, designated generally at 61, is shown in detail in Figures 5 and 6. It provides for a micrometer vertical adjustment by means of a tube 62 slidably carried in a circular opening formed in the outer end of the tracer-holding arm 25. The tube has a longitudinal slot 63 to accommodate the projection of the fixed nut-holding member 64. This member fits loosely in a slot formed in the circular opening facing the end of the arm 25 and is held fixedly in place against one side of the slot by dowel pins 65 and screws 66. A threaded shaft 67 is rotatably mounted in the tube 62 and is threadedly fitted within the fixed nut on the member 64 so that rotation of the shaft by means of a hand wheel 68 will cause the screw to travel longitudinally up and down through the nut. A thrust bearing 69 acting on a cap 70 which is secured to the upper end of the tube 62 causes the tube to move longitudinally with the shaft 67. A micrometer dial 71 is adjustably carried on the hub of the hand wheel 68 and is marked with indications to show the longitudinal movement of the tube 62 resulting from the rotation of the hand wheel 68. It is important that the tube 62 be prevented from having any rotational movement when it is adjusted longitudinally. To prevent such movement, the tube is provided with two longitudinally extending grooves 72 which are placed on opposite sides of and parallel the slot 63. A pair of screws 73 provided with locking nuts are threaded in the end of the arm 25 in respective alinement with the slots 72. The ends of the screws 73 engage the bottom and the sides of the respective grooves 72 to prevent any rotational movement of the tube 62. A clamping screw 73 provided with an operating finger spans the slot formed in the circular opening facing the outer end of the arm 25 and passes through the fixed nut-holding member 64. When this screw is tightened, the size of the circular opening is decreased, and it clamps the tube 62 in place and prevents any movement therebetween after the final adjustment has been obtained.

The universal lateral adjustment of the tracer is obtained through the use of two slides having adjustments in planes arranged 90° apart. This mechanism is well known to those skilled in the art and will be described only generally. The top slide designated generally at 80 is secured to the tube 62 by means of a projection fitting in the bottom thereof and held therein by a tapered pin. Rotation of the hand wheel 81 causes the travel member 82 to have movement back and forth in one plane. Rotation of the hand wheel 83 causes a second traveling member 84 to have movement back and forth in a plane perpendicular to that first mentioned. As is well known, clamp screws are used to lock the various traveling members when the proper adjustment has been reached. The tracer proper has its coupling flange 90 fastened by screws or other means to the travelling member 84. It will be seen that the tracer may be adjusted by this mechanism vertically and universally horizontally relative to the axis of rotation of the cutter spindle and hence the cutting tool carried thereby. The function of the micro universal adjustment is to facilitate the final alinement of the stylus carried by the tracer with the pattern after the pattern and the work have been secured to the table of the milling machine. After the final adjustment has been accomplished, the adjusting mechanisms are locked so that the relative position between the tracer and the cutting tool remain fixed during any movement of them as a unit relative to the work and pattern.

Figure 9:
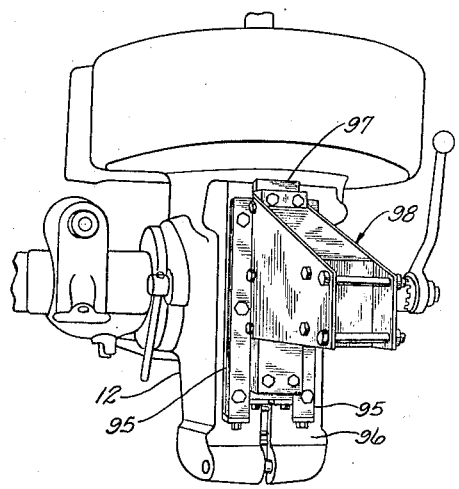
Figure 9 is a perspective view of a modified form of tracer mounting.

In the embodiment of the invention heretofore described, the tracer has been positioned at a substantial distance from the side of the cutter spindle in order to permit the work and the pattern to be placed in end-to-end position on the work-carrying table. When the work is relatively narrow and long, it is preferable to place the pattern and the work in side-by-side position on the work-carrying table. In such instance, the tracer may be carried directly in line with but forwardly of the tracer spindle as viewed when facing the front of the milling machine. In such instance the control arm may be eliminated entirely, and the sliding guide instead of being mounted on a main support extending laterally from the cutter head may be mounted directly on the front of the cutter head. This modification is shown in Figure 9 wherein the outer ways 95 are secured to a flat face 96 formed on the front of the cutter head 12. The inner ways, which fit between the outer ways substantially in a manner identical with that heretofore described with respect to the ways 31, are mounted on a rectangularly shaped block 97 which has an outward projection to which is fastened a carrying arm 98. The arm 98 has its outward end provided with fastening means for holding the tracer either directly or by means of a micro universal adjustment mechanism similar to that heretofore described. A lug (not shown in the drawing) similar to lug 14 extends from the cutter spindle quill or sleeve and directly engages with the travelling block 97 to cause it to move longitudinally with the cutter spindle without any relative movement therebetween. As is well known to those skilled in the art, the weight of the cutter spindle is substantially carried in a balanced condition by a spring mounted in the cutter head and supporting the cutter sleeve. It is only necessary to increase the size of this spring when the tracer mounting is carried on the face of the cutter head as described in this modification in order to enable its weight to be balanced simultaneously with the weight of the cutter spindle.

Although the invention is shown and described in its application to one type of machine, it will be understood that the invention may be applied to other machine tools and is not to be restricted except insofar as is necessitated by the prior art and by the spirit or scope of the following claims.

We claim:

1. Mechanism for moving a tracer in unison with the longitudinal movement of a cutter spindle sleeve comprising: a cutter spindle sleeve mounted for longitudinal movement, a guide having a fixed member having oppositely facing spaced ball-receiving ways, a relatively movable member having ball-receiving ways positioned adjacent to said first-mentioned ways, and a plurality of balls coacting with each set of ways to constrain said movable member to reciprocal movement along a line parallel to the path of the longitudinal movement of the cutter spindle sleeve and to prevent said relatively movable member from canting with respect to said fixed member and thereby creating a binding action between said members when force is applied to said movable member through an extending arm;

an arm rigidly secured to said relatively movable member and connected with said sleeve whereby the longitudinal movement of said sleeve is directly imparted to said relatively movable member; another arm rigidly secured to said relatively movable member and arranged oppositely of said first arm; and means for mounting a tracer on the end of said second arm.

2. Mechanism for moving a tracer in unison with the longitudinal movement of a cutter spindle sleeve comprising: a cutter spindle sleeve mounted for longitudinal movement, a guide having a fixed member having oppositely facing spaced ball-receiving ways, a relatively movable member having ball-receiving ways positioned adjacent to said first-mentioned ways, a plurality of balls coacting with each set of ways to constrain said movable member to reciprocal movement along a line parallel to the path of the longitudinal movement of the cutter spindle sleeve and to prevent said relatively movable member from canting with respect to said fixed member and thereby creating a binding action between said members when force is applied to said movable member through an extending arm, and a balancing spring to counter-balance the weight on said movable member; an arm rigidly secured to said relatively movable member and connected with said sleeve whereby the longitudinal movement of said sleeve is directly imparted to said relatively movable member; another arm rigidly secured to said relatively movable member and arranged oppositely of said first arm; and means for mounting a tracer on the end of said second arm.

3. In a duplicating machine a cutter head, a cutter spindle sleeve mounted in said head for reciprocal longitudinal movement, a cutter spindle rotatably mounted in said sleeve, an arm rigidly mounted on and projecting from said cutter head, a guiding member rigidly carried by said arm, a relatively movable member slidably guided by said guiding member for reciprocal motion parallel to the said movement of said sleeve, a control arm rigidly attached to said relatively movable member, interlocking jaw and abutment means between said sleeve and said control arm whereby they are caused to move in unison, a tracer-carrying arm detachably secured to said relatively movable member, a tracer carried by said tracer-carrying arm, and compressible means acting between said first-named arm and said relatively movable member to counter-balance said control arm, relatively movable member, tracer-carrying arm, and tracer.

4. In a duplicating machine, a cutter head, a cutter spindle sleeve mounted in said head for reciprocal longitudinal movement, a cutter spindle rotatably mounted in said sleeve, an arm rigidly mounted on and projecting from said cutter head, a guiding member rigidly carried by said arm, a relatively movable member slidably guided by said guiding member for reciprocal motion parallel to the said movement of said sleeve, a control arm rigidly attached to said relatively movable member, interlocking jaw and abutment means between said sleeve and said control arm whereby they are caused to move in unison, a tracer-carrying arm detachably secured to said relatively movable member, micrometer universal adjusting means mounted on said tracer-carrying arm, a tracer carried by said adjusting means, and spring means acting between said rigid mounted arm and said relatively movable member to counter-balance said control arm, relatively movable member, tracer-carrying arm, adjusting means, and tracer.

5. In a machine having a cutter head and a vertically movable cutter spindle carring sleeve, a main support fixed to said cutter head and having at its outer end an elongated casing, a vertically movable control arm having an inner end and an outer end provided with an elongated casing, an elongated vertical guide bearing having relatively slidably engaged parts mounted on said casings to permit vertical movement of said control arm and prevent canting of said arm as force is applied at its inner end, means interconnecting the inner end of said control arm and said sleeve to directly transmit vertical movement therebetween, a counter-balancing spring mounted between said casings to substantially carry the weight of said control arm and a tracer and tracer-carrying arm, a tracer-carrying arm having one end detachably connected to the casing on said control arm, and a tracer mounted in the other end of said tracer-carrying arm.

6. In a machine having a cutter head and a vertically movable cutter spindle carrying sleeve, a main support fixed to said cutter head and having at its outer end an elongated casing, a vertically movable control arm having an inner end and an outer end provided with elongated casing, an elongated vertical guide bearing having relatively slidably engaged parts mounted on said casings to permit vertical movement of said control arm and prevent canting of said arm as force is applied at its inner end, means interconnecting the inner end of said control arm and said sleeve to directly transmit vertical movement therebetween, a tracer-carrying arm having one end detachably connected to the casing on said control arm, a tracer mounted in the other end of said tracer-carrying arm, and said control arm and tracer-carrying arm being proportioned so that the center gravity of said arms and tracer is substantially centered at said sliding bearing.

7. In a machine having a cutter head and a vertically movable cutter spindle carrying sleeve, a main support fixed to said cutter head and having at its outer end an elongated casing, a vertically moveable control arm having an inner end and an outer end provided with elongated casing, an elongated vertical guide bearing having relatively slidably engaged parts mounted on said casings to permit vertical movement of said control arm and prevent canting of said arm as force is applied at its inner end, means interconnecting the inner end of said control arm and said sleeve to directly transmit vertical movement therebetween, a counter-balancing spring mounted between said casings to substantially carry the weight of said control arm and a tracer and tracer-carrying arm, a tracer-carrying arm having one end detachably connected to the casing on said control arm, a tracer mounted in the other end of said tracer-carrying arm, and said control arm and tracer-carrying arm being proportioned so that the center gravity of said arms and tracer is substantially centered at said sliding bearing.

8. In a machine having a cutter head, a cutter spindle sleeve mounted for vertical movement in said head, and a cutter spindle carried in said sleeve, tracer-mounting mechanism comprising a main support fixed to said cutter head and having at its outer end an elongated casing, a vertically movable control arm having an inner end and an outer end provided with an elongated casing, an elongated vertical guide bearing having relatively slidably engaged parts mounted on said casings to permit vertical movement of said control arm and prevent canting of said arm as force is applied at its inner end, interlocking jaw and lug means carried by said sleeve and said inner end to directly transmit vertical movement therebetween, a counter-balancing spring mounted between said casings to substantially carry the weight of said control arm and a tracer and tracer-carrying arm, a tracer-carrying arm having one end detachably connected to the casing on said control arm, a tracer mounted in the other end of said tracer-carrying arm, and said control arm and tracer-carrying arm being proportioned so that the center gravity of said arms and tracer is substantially centered at said sliding bearing.

PETER M. HENKES.
FRED STEINBRECKER.

REFERENCES CITED

The following references are of record in the file of this patent:

UNITED STATES PATENTS

| Number | Name | Date |
| --- | --- | --- |
| 960,765 | Albee | June 7, 1910 |
| 1,073,547 | Tunes | Sept. 16, 1913 |
| 1,313,543 | Keller | Aug. 19, 1919 |
| 1,440,184 | Stenger | Dec. 26, 1922 |
| 1,959,178 | Sassen | May 15, 1934 |
| 1,964,319 | Gorton et al. | June 26, 1934 |
| 2,161,709 | Henkes | June 6, 1939 |
| 2,389,653 | Turchan et al | Nov. 27, 1945 |

FOREIGN PATENTS

| Number | Country | Date |
| --- | --- | --- |
| 636,727 | Germany | Oct. 14, 1936 |